United States Patent
Han et al.

(10) Patent No.: US 12,436,813 B2
(45) Date of Patent: Oct. 7, 2025

(54) MEMORY DISAGGREGATION IN A MULTI-NODE ENVIRONMENT

(71) Applicant: DELL PRODUCTS L.P., Round Rock, TX (US)

(72) Inventors: Yunfan Han, Austin, TX (US); Isaac Q. Wang, Austin, TX (US); Jordan Chin, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 731 days.

(21) Appl. No.: 17/862,979

(22) Filed: Jul. 12, 2022

(65) Prior Publication Data

US 2024/0020174 A1 Jan. 18, 2024

(51) Int. Cl.
*G06F 9/46* (2006.01)
*G06F 9/50* (2006.01)

(52) U.S. Cl.
CPC .......... *G06F 9/5055* (2013.01); *G06F 9/5044* (2013.01); *G06F 9/5077* (2013.01)

(58) Field of Classification Search
CPC ..... G06F 9/5055; G06F 9/5044; G06F 9/5077
See application file for complete search history.

(56) References Cited

U.S. PATENT DOCUMENTS 11,144,340 B2 10/2021 Warnicke et al.
2017/0192825 A1 7/2017 Biberman et al.

*Primary Examiner* — Gregory A Kessler
(74) *Attorney, Agent, or Firm* — Larson Newman, LLP

(57) ABSTRACT

An information handling system includes processing nodes, a compute express link (CXL) switch, and CXL devices. A workload orchestrator receives a workload to be instantiated on a particular one of the processing nodes, determines a set of resources associated with the workload, selects a particular one of the CXL devices to be used based upon the set or resources, and launches the workload on the processing node.

20 Claims, 4 Drawing Sheets

MEMORY DISAGGREGATION IN A MULTI-NODE ENVIRONMENT

FIELD OF THE DISCLOSURE

This disclosure generally relates to information handling systems, and more particularly relates to providing memory disaggregation in a multi-node environment.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include processing nodes, a compute express link (CXL) switch, CXL devices, and a workload orchestrator. The workload orchestrator may receive a workload to be instantiated on a particular one of the processing nodes, determine a set of resources associated with the workload, select a particular one of the CXL devices to be used based upon the set or resources, and launch the workload on the processing node.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
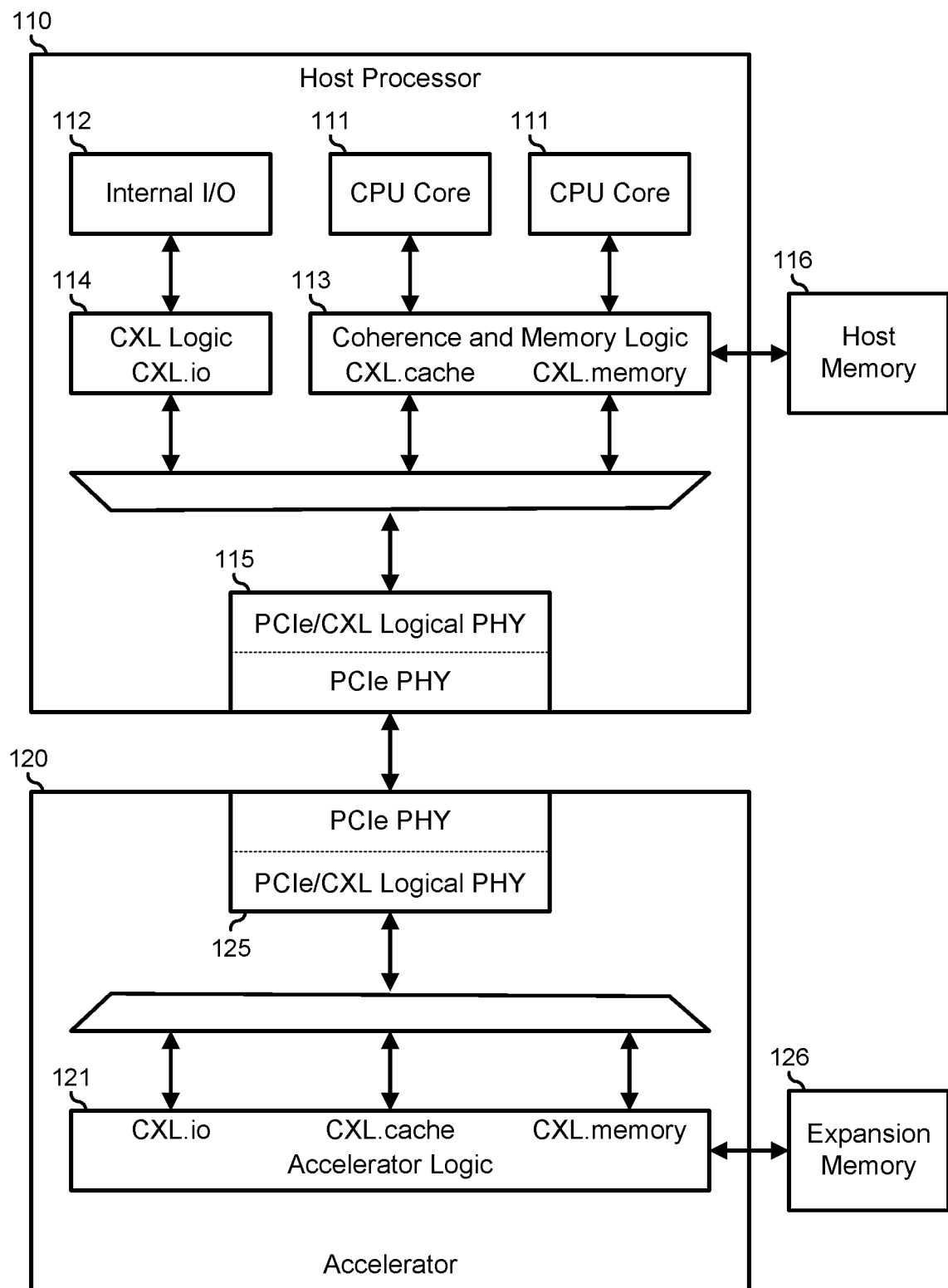
FIG. 1 is a block diagram of a compute express link (CXL) information handling system according to an embodiment of the current disclosure.

FIG. 1 shows an information handling system 100, including a host processor 110 with associated host memory 116, and an accelerator device 120 with associated expansion memory 126. Host processor 110 includes one or more processor core 111, various internal input/output (I/O) devices 112, coherence and memory logic 113, Compute Express Link (CXL) logic 114, and a PCIe physical layer (PHY) interface 115. Coherence and memory logic 113 provides cache coherent access to host memory 116. The operation of a host processor, and particularly of the component functional blocks within a host processor, are known in the art, and will not be further described herein, except as needed to illustrate the current embodiments.

Accelerator device 120 includes accelerator logic 121, and a PCIe PHY interface 125 that is connected to PCIe PHY interface 115. Accelerator logic 121 provides access to expansion memory 126. Accelerator device 120 represents a hardware device configured to enhance the overall performance of information handling system 100. An examples of accelerator device 120 may include a smart Network Interface Card (NIC) or Host Bus Adapter (HBA), a Graphics Processing Unit (GPU), Field Programmable Gate Array (FPGA), or Application Specific Integrated Circuit (ASIC) device, a memory management and expansion device or the like, or another type of device configured to improve the performance of information handling system 100, as needed or desired. In particular, being coupled to host processor 110 via the PCIe link established between PCIe interfaces 115 and 125, accelerator device 120 may represent a task-based device that receives setup instructions from the host processor, and then independently executes the tasks specified by the setup instructions. In such cases, accelerator device 120 may access host memory 116 via a Direct Memory Access (DMA) device or DMA function instantiated on the host processor. When representing a memory management device, accelerator device 120 may represent a device configured to provide an expanded memory capacity, in the form of expansion memory 126, thereby increasing the overall storage capacity of information handling system 100, or may represent a memory capacity configured to increase the memory bandwidth of the information handling system, as needed or desired.

Information handling system 100 represents an information handling system configured in conformance with a Compute Express Link (CXL) standard, such as a CXL 1.1 specification, a CXL 2.0 specification, or any other CXL standard as may be published from time to time by the CXL Consortium. The CXL standard is an industry-supported interconnection standard that provides a cache-coherent interconnection between processors, accelerator devices, memory expansion devices, or other devices, as needed or desired. In this way, operations performed at diverse locations and by diverse architectures may maintain a memory coherency domain across the entire platform. The CXL standard provides for three (3) related protocols: CXL.io, CXL.cache, and CXL.memory. The CXL.io protocol represents an I/O protocol that is based upon the PCIe 5.0 protocol (for CXL specification 1.1) or the PCIe 6.0 protocol (for CXL specification 2.0).

For example, the CXL.io protocol provides for device discovery, configuration, and initialization, interrupt and DMA handling, and I/O virtualization functions, as needed or desired. The CXL.cache protocol provides for processors to maintain a cache-coherency domain with accelerator devices and their attached expansion memory, and with capacity- and bandwidth-based memory expansion devices, as needed or desired. The CXL.memory protocol permits processors and the like to access memory expansion devices in a cache-coherency domain utilizing load/store-based commands, as needed or desired. Further, the CXL.memory protocol permits the use of a wider array of memory types than may be supported by processor 110. For example, a processor may not provide native support for various types of non-volatile memory devices, such as Intel Optane Persistent Memory, but the targeted installation of an accelerator device that supports Intel Optane Persistent Memory may permit the information handling system to utilize such memory devices, as needed or desired.

In this regard, host processor 110 and accelerator device 120 each include logic and firmware configured to instantiate the CXL.io, CXL.cache, and CXL.memory protocols. In particular, within host processor 110, coherence and memory logic 113 instantiates the functions and features of the CXL.cache and CXL.memory protocols, and CXL logic 114 implements the functions and features of the CXL.io protocol. Further, PCIe PHY 115 instantiates a virtual CXL logical PHY. Likewise, within accelerator device 120, accelerator logic 121 instantiates the CXL.io, CXL.cache, and CXL.memory protocols, and PCIe PHY 125 instantiates a virtual CXL logical PHY. Within a CXL enabled accelerator device such as accelerator device 120, both the CXL.cache and CXL.memory protocols do not have to be instantiated, as needed or desired, but any CXL enabled accelerator device must instantiate the CXL.io protocol.

Figure 2:
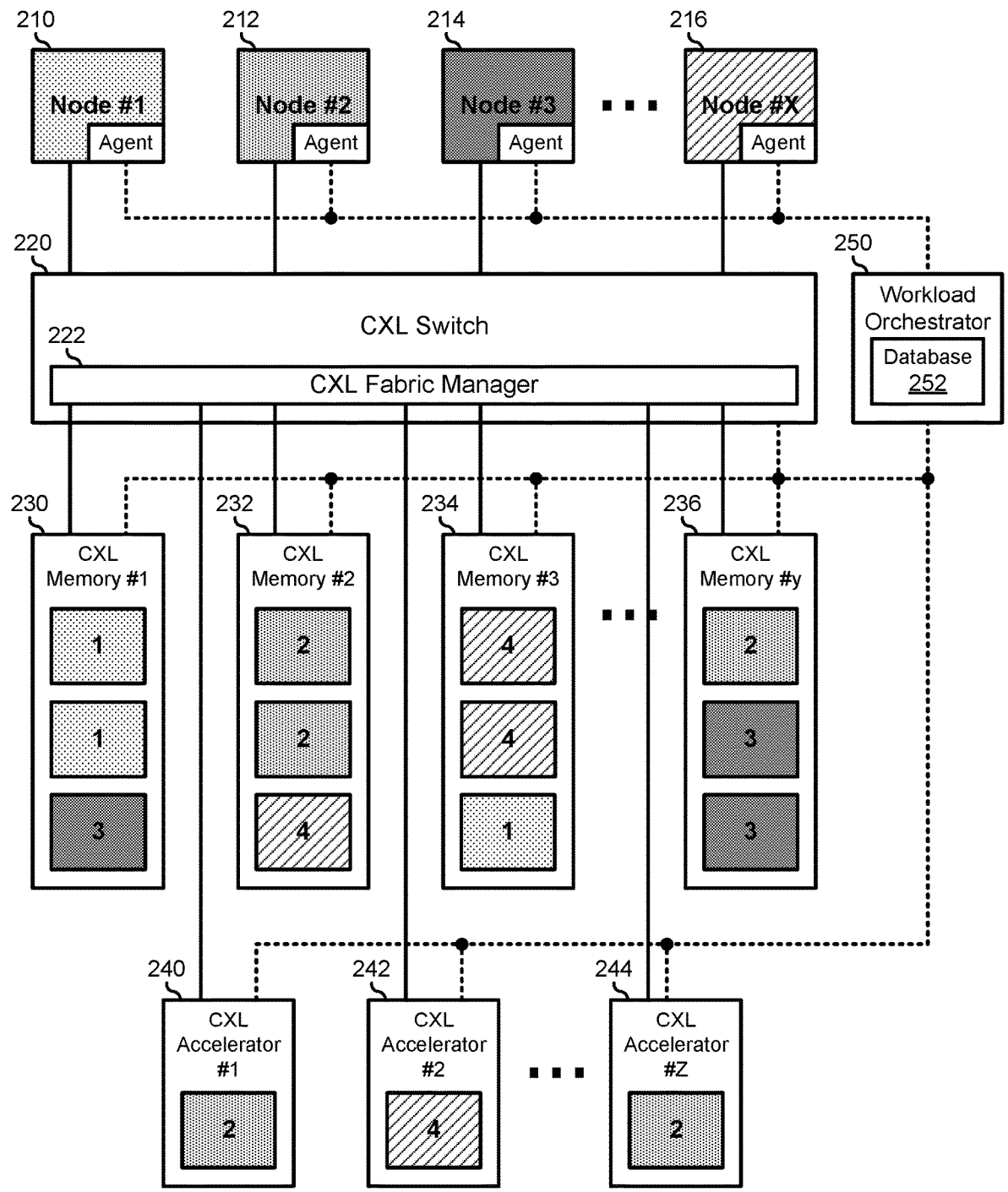
FIG. 2 is a block diagram of a CXL processing environment according to another embodiment of the current disclosure.

FIG. 2 illustrates a multi-node CXL processing environment 200, including a number (X) of processing nodes 210, 212, 214, and 216, a CXL switch 220, a number (Y) of CXL storage nodes 230, 232, 234, and 236, a number (Z) of CXL accelerators 240, 242, and 244, and a workload orchestrator 250. The scale of processing environment 200 is highly flexible due to the implementation of a particular CXL standard. In particular, the CXL standard is intended to provide a highly scalable architectural framework. As such, in a particular embodiment, CXL processing environment 200 represents an individual information handling system, where processing nodes 210, 212, 214, and 216 represent individual processors or processor cores, where CXL storage nodes 230, 232, 234, and 236 represent individual memory riser cards or direct attached storage arrays, and where CXL accelerators 240, 242, and 244 represent accelerators installed into the information handling system. In another embodiment, CXL processing environment 200 represents a distributed network of information handling systems with associated aggregated resources. Processing nodes 210, 212, 214, and 216 represent individual information handling systems, CXL storage nodes 230, 232, 234, and 236 represent aggregated storage resources such as SANs, NAS', and CXL accelerators 240, 242, and 244 represent dedicated accelerators such as purpose-built GPU, FPGA, or ASIC platforms.

Processing nodes 210, 212, 214, and 216 each provide processing functions for one or more workloads in a multi-user/multi-tenant processing environment. For example, each of processing nodes 210, 212, 214, and 216 may provide for the simultaneous processing on multiple process threads, may instantiate one or more virtual machines under the direction of a virtual machine manager (VMM) or virtual machine hypervisor, may provide one or more virtual desktop environment for multiple users of processing environment 200, or may otherwise provide processing for one or more other type of workload, as needed or desired. In this regard, processing nodes 210, 212, 214, and 216 utilize resources from a pool of resources including CXL storage nodes 230, 232, 234, and 236, and CXL accelerators 240, 242, and 244 in providing the processing functions for the workloads instantiated thereon. Processing node 210 is illustrated as utilizing storage resources of CXL memory nodes 230 and 234, processing node 212 is illustrated as utilizing storage resources of CXL memory nodes 232 and 236, and as utilizing accelerator functions of CXL accelerators 240 and 244, processing node 214 is illustrated as utilizing storage resources of CXL memory nodes 230 and 236, and processing node 216 is illustrated as utilizing storage resources of CXL memory nodes 232 and 234, and as utilizing accelerator functions of CXL accelerator 242.

CXL switch 220 represents an extension of PCIe switching to the CXL standard. Here CXL switch 220 operates to connect a particular host with a particular number of PCIe lanes with an increased number of downstream lanes to increase the number of supported devices. For example, CXL switch 220 may have an upstream interface with one or more of processing nodes 210, 212, 214, or 216 by a x16 interface, but may offer x48 PCIe lanes to support, e.g., six (6)×8 GPUs. Such a topology may suffer upstream bottlenecks, but, where the GPUs support GPU-to-GPU connectivity, may provide greater overall performance for the workloads that utilize the GPUs. Further, CXL switch 220 may support switch-to-switch connectivity. As such, one or more processing environment similar to processing environment 200 may be connected to provide a more highly scaled CXL domain. Thus CXL switch 220 may be understood to represent two or more interconnected CXL switches, as needed or desired. In a particular embodiment, CXL switch 220 supports up to 16 upstream host processing nodes. In another embodiment, CXL switch 220 represents a multi-layer topology where one CXL switch is configured to drive one or more downstream CXL switch, as needed or desired.

CXL switch 220 includes a CXL fabric manager 222 that provides for standardized inventory and resource allocation. In particular, where, as illustrated here, CXL memory nodes 230, 232, 234, and 236, may be logically partitioned to support processing nodes 210, 212, 214, and 216, CXL fabric manager 222 operates to partition the memory nodes and to assign the logical devices to the processing nodes. CXL fabric manager 222 further supports memory pooling. In particular, where one or more of CXL memory nodes 230, 322, 234, and 236 represent multiple logical devices (MLDs), that is, devices with more than one physical port, CXL fabric manager 222 supports binding MLD ports to the processing node hierarchies.

Workload orchestrator 250 is configured to monitor, manage, and maintain workloads instantiated on the processing nodes 210, 212, 214, and 216. As such, workload orchestrator 250 operates to inventory CXL memory nodes 230, 232, 234, and 236, and CXL accelerators 240, 242, and 244, including any logical devices and the respective functions and features of the components of processing environment 200. Workload orchestrator 250 further operates to determine the processing needs of the workloads instantiated on processing nodes 210, 212, 214, an 216, including any personality traits of the workloads, such as any affinities for memory storage capacity, memory bandwidth, and memory transaction latency, processing affinities for High-Performance Computing (HPC), machine learning, neural network processing, artificial intelligence processing, virtualization, GPU, FPGA, or ASIC affinities, or the like.

Utilizing the logical arrangement information, the component function and feature information, the processing needs information, and the like, workload orchestrator 250 operates to optimize the placement of the workloads instantiated on processing nodes 210, 212, 214, and 216, and the allocation of resources to the instantiated workloads, including the allocation of CXL memory nodes 230, 232, 234, and 236, and CXL accelerators 240, 242, and 244, to achieve an maximum level of processing performance within the constraints provided by processing environment 200. In particular, when a new workload is launched, workload orchestrator 250 operates to evaluate the needs of the new workload against the currently available resources to determine a set of potential resources to allocate to the new workload. For example, workload orchestrator 250 determines a particular one of processing nodes 210, 212, 214, and 216 upon which to instantiate the new workload, and, based upon the logical arrangement information, the component function and feature information, the processing needs information, determines an optimized set or resources to allocate to the new workload.

The allocation of resources may further involve the migration of workloads from a first set of resources to a newly selected set of resources. For example, if a new workload is determined by workload orchestrator 250 to be more latency sensitive than an existing workload, and further if the existing workload is allocated to a set of low latency resources, the workload orchestrator can operate to migrate the existing workload to a new set of resources that present a higher latency, and can then instantiate the new workload with the low-latency set of resources. Workload orchestrator 250 further operates to reclaim resources of processing environment 200 when a particular workload has finished processing.

As illustrated, workload orchestrator 250 is implemented as a separate component of processing environment 200. For example, workload orchestrator 250 may be instantiated on a management system of a datacenter, or another separate component of processing environment 200. However, it will be understood that a workload orchestrator similar to workload orchestrator 250 may be implemented in various components of a processing system, as needed or desired. For example, a workload orchestrator my be implemented by a CXL switch, as an element of a stand-alone processing node dedicated to the tase of workload orchestration, or as an element instantiated on one of the processing nodes of the processing environment, as needed or desired.

Moreover, workload orchestrator 250 may be implemented as an in-band function of processing environment 200, or as an out-of-band function of the processing environment. In the in-band implementation, workload orchestrator 250 may be instantiated as a process, a program, an application, a utility, or the like, that is resident on an operating system of the hosting processing node. Workload orchestrator 250 may be understood to utilize processing cycles of the processing node upon which the workload orchestrator is instantiated, and communications, such as retrieving workload requirements from processing nodes 210, 212, 214, and 216, and determining the functions, features, and availability of CXL memory nodes 230, 232, 234, and 236, and of CXL accelerators 240, 242, and 244 will be performed on in-band resources of processing environment 200, such as on communication interfaces directed by the processors of the processing nodes, CXL switch 220, the CXL memory nodes and the CXL accelerators. In the out-of-band implementation, workload orchestrator 250 may be instantiated within one or more components of a management network of processing environment 200.

Such a management network may include Baseboard Management Controllers (BMCs) resident on one or more of the components of processing environment 200, a management system associated with the processing environment, or the like. In this case, workload orchestrator 250, and the management network instantiated on processing environment 200, may include management agents within processing nodes 210, 212, 214, and 216 that gather the relevant workload information from the in-band resources of the processing nodes, that receive the resource allocations associated with the workloads instantiated on the associated processing nodes, and then launch the various task, functions, allocations, and settings to implement the workloads as directed by the workload orchestrator, as needed or desired. The management agents may further operate to notify workload manager 250 when a particular workload has completed its processing task, in order to permit the workload orchestrator to deallocate the resources back into the pool of resources available for future use.

In addition to allocating resources based upon the logical arrangement information, the component function and feature information, and the processing needs information, workload orchestrator 250 operates to allocate resources based upon various external considerations. For example, workload orchestrator 250 may allocate resources in order to provide the peak overall performance of processing environment 200 or the particular processing node, in order to implement Quality-of-Service (QoS) requirements of the workloads, user or tenant rights to, or reservations for access the various resources, in order to implement various policies, or the like. Additionally, workload orchestrator 250 operates to set up CXL switch 220 with routing information to implement the allocation of resources to the workloads, including establishing virtual switching within the CXL switch, as needed or desired. As such, in allocating the resources of processing environment 200, workload orchestrator 250 accesses a database 252 that stores information related to the peak overall performance of the processing environment or processing nodes, the user or tenant rights to, or reservations for access the various resources, policy information, and the like, to enable the workload orchestrator to perform the allocations, as needed or desired. In a particular embodiment, workload orchestrator 250 includes a user interface that permits a system administrator of processing environment 200 to interact with the workload orchestrator. The system administrator may have access to force various allocations, as needed or desired. Further, workload orchestrator 250 may provide various logging and feedback information to the system administrator via the user interface.

Particular examples where workload orchestrator 250 allocates the resources of processing environment 200 may include a case where the workload orchestrator determines that processing node 210 is operating at or near full capacity, but that CXL memory node 230, which may be in a common memory domain, such as a Non-Uniform Memory Access (NUMA) domain, with processing node 210, is not fully utilized. Workload orchestrator 250 may further determine that processing node 212 is not operating at full capacity, but that CXL memory node 232, which may be in a common NUMA domain with processing node 212, is fully utilized. Here, workload orchestrator 250 may, upon receiving a new workload, direct processing node 212 to instantiate the new workload, and allocate memory from CXL memory node 230 to the new workload. In another case, it will be understood that the memory capacity of CXL memory nodes 230, 232, 234, and 236 may become fragmented over time. Workload orchestrator 250 operates to manage and maintain memory address allocations for newly instantiated workloads with an aim to reduce memory fragmentation, and to thereby improve performance. Moreover, workload orchestrator 250 can implement policy aims, such as running high-memory usage workloads on larger capacity CXL memory nodes, or running high-memory bandwidth workloads across several of the CXL memory nodes, or the like.

Figure 3:
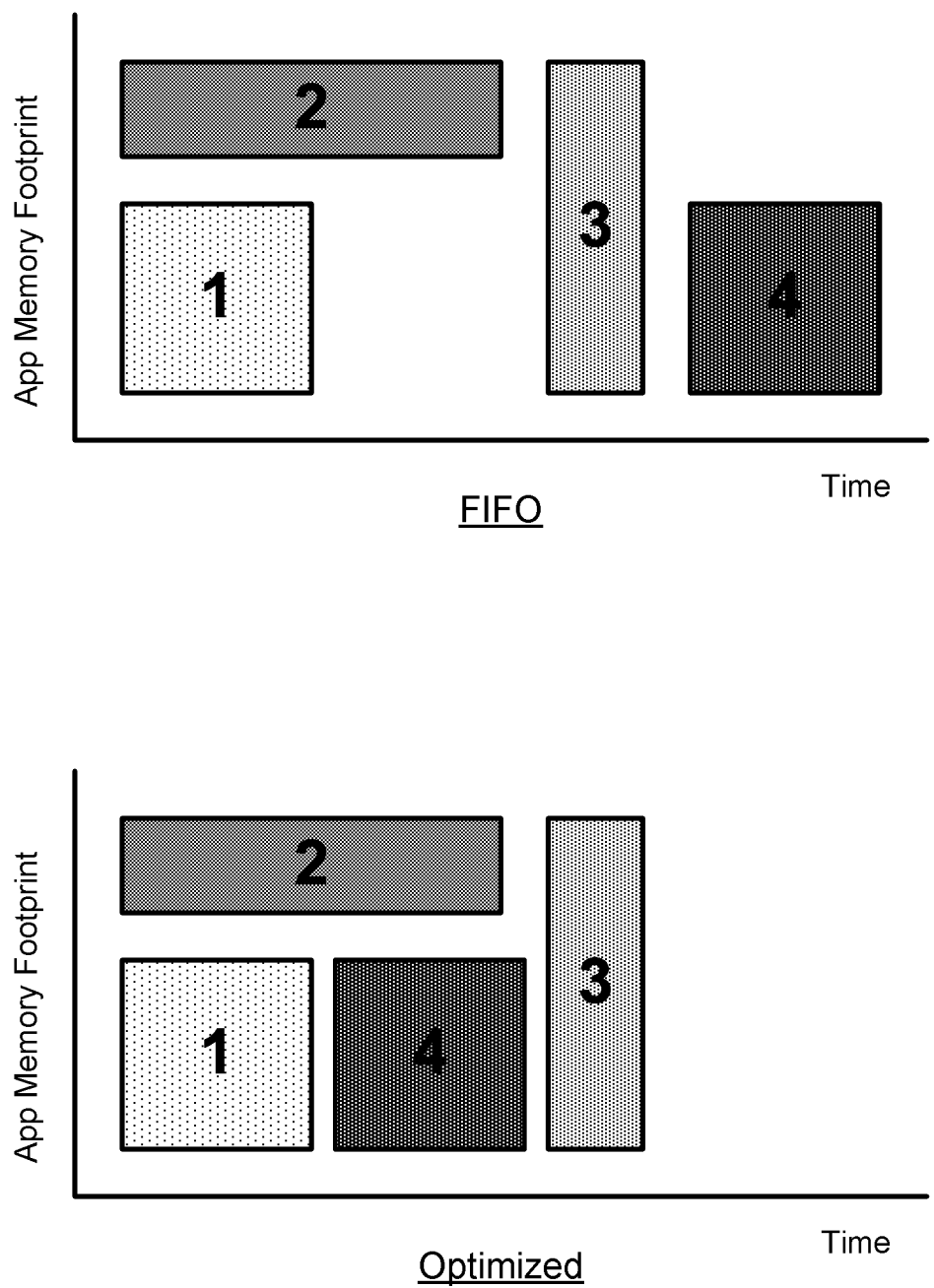
FIG. 3 includes charts illustrating methods application placement in the CXL processing environment of FIG. 2.

In another case, workload orchestrator 250 operates to schedule workloads within processing environment 200 to optimize resource utilization. A top portion of FIG. 3 illustrates an application/memory allocation over time for a typical workload scheduler, where workloads are scheduled on a first-in, first-out (FIFO) basis. A first workload (1) is launched, and a determination is made that there are sufficient memory resources for a second workload (2). However, the first workload (1) requires a shorter duration of time than the second workload (2), and completes processing before the second workload (2). A third workload (3) is received that requires a greater quantity of memory to run, so the third workload (3) is not launched until the second workload (2) has completed processing. Here, a fourth workload (4) has to wait until the third workload (3) has completed processing before the fourth workload (4) is launched.

In contrast, a bottom portion of FIG. 3 illustrates an application/memory allocation over time for workload orchestrator 250. Here, the first workload (1), the second workload (2), the third workload (3), and the fourth workload (4) are provided to workload orchestrator 250. However, here the workloads each include a time limitation value that defines a maximum duration of time that the workload needs to complete processing. The first workload (1) and the second workload (2) are launched as described above. However, when the first workload completes processing, workload orchestrator 250 determines that there is sufficient memory resources to launch the fourth workload (4), and that there is sufficient time for the fourth workload (4) to complete processing before the second workload (2) completes processing. Workload orchestrator 250 launches the fourth workload (4) prior to launching the third workload (3), utilizing the unused memory capacity and time duration to complete the fourth workload (4), thereby improving memory utilization.

Figure 4:
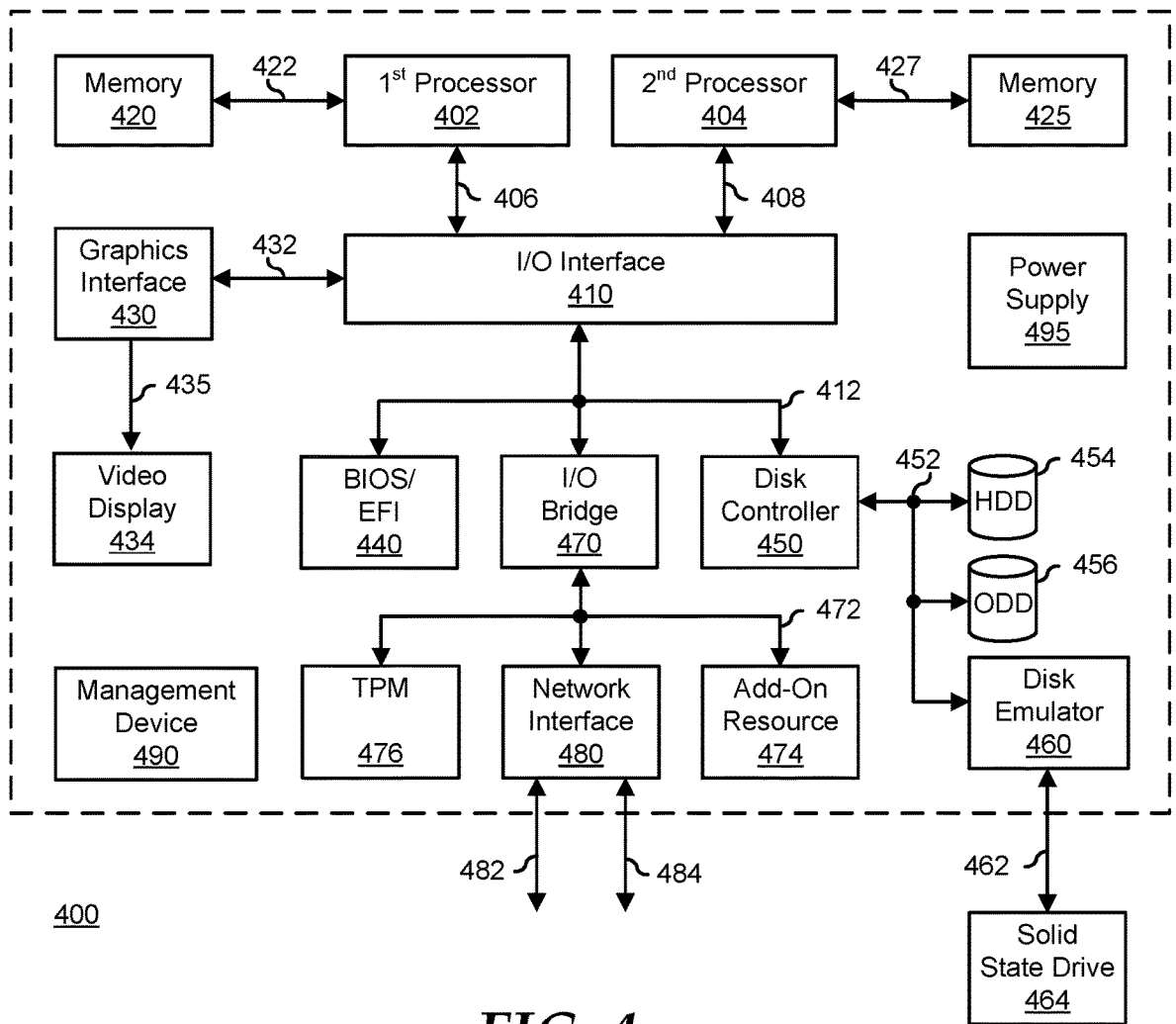
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420 and 425, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 435 to a video display 434. In a particular embodiment, information handling system 400 includes separate memories that are dedicated to each of processors 402 and 404 via separate memory interfaces. An example of memories 420 and 425 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on a separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a plurality of processing nodes;
a compute express link (CXL) switch;
a plurality of CXL devices; and
a workload orchestrator configured to receive a first workload to be instantiated on a first one of the processing nodes, to determine a first set of resources associated with the first workload, to select a first one of the CXL devices to be used based upon the first set or resources, and to launch the first workload on the first processing node.

2. The information handling system of claim 1, wherein the first CXL device includes a CXL memory device.

3. The information handling system of claim 2, wherein the first set of resources includes a logical drive of the CXL memory device.

4. The information handling system of claim 3, wherein, in launching the first workload on the first processing node, the workload orchestrator is further configured to direct the CXL switch to map the first processing node to the logical drive.

5. The information handling system of claim 4, wherein the CXL switch includes a CXL fabric manager configured to partition the first CXL memory device to include the logical drive.

6. The information handling system of claim 1, wherein the first CXL device includes a CXL accelerator device.

7. The information handling system of claim 6, wherein the CXL accelerator device includes one of a graphics processing unit, a field programmable gate array, and an application specific integrated circuit.

8. The information handling system of claim 1, wherein the workload orchestrator is further configured to receive a second workload to be instantiated on the first processing node, to determine that a second one of the processing nodes is underutilized, to determine a second set of resources associated with the second workload, to select a second one of the CXL devices to be used based upon the second set or resources, and to launch the second workload on the second processing node.

9. The information handling system of claim 1, wherein the workload orchestrator is instantiated in the first processing node.

10. The information handling system of claim 1, wherein the workload orchestrator is instantiated in the CXL switch.

11. A method, comprising:
coupling a plurality of processing nodes to a compute express link (CXL) switch;
coupling a plurality of CXL devices to the CXL switch;
receiving, by a workload orchestrator, a first workload to be instantiated on a first one of the processing nodes;
determining a first set of resources associated with the first workload;
selecting a first one of the CXL devices to be used based upon the first set or resources; and
launching the first workload on the first processing node.

12. The method of claim 11, wherein the first CXL device includes a CXL memory device.

13. The method of claim 12, wherein the first set of resources includes a logical drive of the CXL memory device.

14. The method of claim 13, wherein, in launching the first workload on the first processing node, the method further comprise directing the CXL switch to map the first processing node to the logical drive.

15. The method of claim 14, wherein:
the CXL switch includes a CXL fabric manager; and
the method further comprises partitioning, by the CXL fabric manager, the CXL memory device to include the logical drive.

16. The method of claim 11, wherein the first CXL device includes a CXL accelerator device.

17. The method of claim 16, wherein the CXL accelerator device includes one of a graphics processing unit, a field programmable gate array, and an application specific Integrated circuit.

18. The method of claim 11, further comprising:
receiving, by the workload orchestrator, a second workload to be instantiated on the first processing node;
determining that a second one of the processing nodes is underutilized;
determining a second set of resources associated with the second workload;
selecting a second one of the CXL devices to be used based upon the second set or resources; and
launching the second workload on the second processing node.

19. The method of claim 11, wherein the workload orchestrator is instantiated in one of the first processing node and the CXL switch.

20. An information handling system, comprising:
a plurality of processing nodes;
a compute express link (CXL) switch;
a plurality of CXL memory devices; and
a workload orchestrator configured to receive a workload to be instantiated on a particular one of the processing nodes, to determine a set of resources associated with the workload, to select a particular one of the CXL memory devices to be used based upon the set or resources, and to launch the workload on the processing node.

* * * * *